US009542448B2

(12) United States Patent
Schöning

(10) Patent No.: US 9,542,448 B2
(45) Date of Patent: Jan. 10, 2017

(54) SYSTEMS AND/OR METHODS FOR TAILORING EVENT PROCESSING IN ACCORDANCE WITH BOUNDARY CONDITIONS

(75) Inventor: Harald Schöning, Dieburg (DE)

(73) Assignee: SOFTWARE AG, Darmstadt (DE)

(*) Notice: Subject to any disclaimer, the term of this patent is extended or adjusted under 35 U.S.C. 154(b) by 1394 days.

(21) Appl. No.: 12/926,223

(22) Filed: Nov. 3, 2010

(65) Prior Publication Data

US 2012/0110599 A1 May 3, 2012

(51) Int. Cl.
*G06F 9/54* (2006.01)
*G06F 17/30* (2006.01)

(52) U.S. Cl.
CPC ........ *G06F 17/30516* (2013.01); *G06F 9/542* (2013.01); *G06F 17/30477* (2013.01)

(58) Field of Classification Search
None
See application file for complete search history.

(56) References Cited

U.S. PATENT DOCUMENTS

| 6,092,102 | A  | * | 7/2000  | Wagner .................. 340/7.29 |
| 6,182,120 | B1 | * | 1/2001  | Beaulieu et al. .......... 709/207 |
| 6,449,618 | B1 | * | 9/2002  | Blott et al. |
| 6,658,485 | B1 | * | 12/2003 | Baber et al. ............ 719/314 |
| 7,380,248 | B1 | * | 5/2008  | Isenberg et al. .......... 719/314 |
| 7,493,406 | B2 |   | 2/2009  | Amini et al. |
| 7,613,848 | B2 |   | 11/2009 | Amini et al. |
| 7,751,398 | B1 | * | 7/2010  | Veprinsky et al. ........ 370/392 |
| 2002/0107864 | A1 | * | 8/2002 | Battas et al. ............ 707/101 |
| 2002/0123989 | A1 | * | 9/2002 | Kopelman et al. ........... 707/3 |
| 2002/0165903 | A1 | * | 11/2002 | Zargham et al. .......... 709/202 |
| 2002/0174263 | A1 | * | 11/2002 | Codd et al. ................ 709/318 |
| 2003/0005174 | A1 | * | 1/2003 | Coffman et al. ........... 709/318 |
| 2003/0131063 | A1 | * | 7/2003 | Breck ...................... 709/206 |
| 2003/0131143 | A1 | * | 7/2003 | Myers ...................... 709/318 |
| 2003/0177183 | A1 | * | 9/2003 | Cabrera et al. ............ 709/204 |
| 2004/0078724 | A1 | * | 4/2004 | Keller et al. ............... 714/48 |

(Continued)

FOREIGN PATENT DOCUMENTS

| WO | 2008/097912 | 8/2008 |
| WO | 2009/134945 | 11/2009 |

OTHER PUBLICATIONS

Luckham, et al., "Event Processing Glossary—Version 1.1," Event Processing Technical Society, Jul. 2008.

(Continued)

*Primary Examiner* — Shih-Wei Kraft
(74) *Attorney, Agent, or Firm* — Nixon & Vanderhye, P.C.

(57) ABSTRACT

The technology relates to techniques for the attachment of priorities and/or reaction time limits to various entities of a system such as, for example, events, event types, queries, etc. The system's processing may be tailored behavior to match these boundary conditions while at the same time increasing (and sometimes even maximizing) the rate of events processed. Advantageously, the system may be made to adapt its behavior to the current situation, which is changeable and may even be changing quite frequently, e.g., as in connection with a potentially rapidly changing stream. Users may, for example, specify policies to control this adaptation and, thus, events (including events of special interest) may be handled appropriately, even in response to changing conditions.

26 Claims, 5 Drawing Sheets

(56) References Cited

U.S. PATENT DOCUMENTS

| | | | |
|---|---|---|---|
| 2004/0078802 A1* | 4/2004 | Hammer et al. | 719/318 |
| 2005/0010558 A1* | 1/2005 | Dettinger et al. | 707/3 |
| 2005/0192937 A1* | 9/2005 | Barsness et al. | 707/3 |
| 2005/0246301 A1 | 11/2005 | Lin et al. | |
| 2006/0090165 A1* | 4/2006 | Martin et al. | 719/318 |
| 2006/0190430 A1* | 8/2006 | Luo et al. | 707/3 |
| 2007/0162421 A1* | 7/2007 | Pang et al. | 707/2 |
| 2007/0198397 A1* | 8/2007 | McGinley et al. | 705/37 |
| 2008/0072221 A1* | 3/2008 | Chkodrov et al. | 718/1 |
| 2008/0133891 A1 | 6/2008 | Salz et al. | |
| 2008/0134158 A1 | 6/2008 | Salz et al. | |
| 2008/0196006 A1 | 8/2008 | Bates et al. | |
| 2008/0209078 A1 | 8/2008 | Bates et al. | |
| 2008/0243463 A1 | 10/2008 | Lovas et al. | |
| 2008/0262890 A1* | 10/2008 | Korupolu et al. | 705/8 |
| 2008/0301124 A1 | 12/2008 | Alves et al. | |
| 2009/0006320 A1 | 1/2009 | Ding et al. | |
| 2009/0064182 A1 | 3/2009 | Holar et al. | |
| 2009/0070786 A1* | 3/2009 | Alves et al. | 719/318 |
| 2009/0112853 A1* | 4/2009 | Nishizawa et al. | 707/5 |
| 2009/0171999 A1 | 7/2009 | McColl et al. | |
| 2009/0222397 A1 | 9/2009 | Proctor et al. | |
| 2009/0249287 A1 | 10/2009 | Patrick | |
| 2009/0292759 A1 | 11/2009 | Piper et al. | |
| 2009/0292877 A1 | 11/2009 | Piper et al. | |
| 2009/0313400 A1 | 12/2009 | Amini et al. | |
| 2010/0030896 A1 | 2/2010 | Chandramouli et al. | |
| 2010/0031232 A1 | 2/2010 | Glazier et al. | |
| 2010/0082603 A1* | 4/2010 | Krompass et al. | 707/719 |
| 2010/0083145 A1 | 4/2010 | Schang et al. | |
| 2010/0095299 A1* | 4/2010 | Gupta et al. | 718/103 |
| 2010/0153363 A1 | 6/2010 | Suzuki et al. | |
| 2010/0251262 A1 | 9/2010 | Rokicki et al. | |

OTHER PUBLICATIONS

Vincent, Paul, "Complex Event Processing blog," http://tibcoblogs.com/cep/2008/11/17/the-value-of-production-rules/, retrieved Nov. 3, 2010.

* cited by examiner

SYSTEMS AND/OR METHODS FOR TAILORING EVENT PROCESSING IN ACCORDANCE WITH BOUNDARY CONDITIONS

FIELD OF THE INVENTION

Certain example embodiments described herein relate to stream processing. More particularly, certain example embodiments described herein relate to techniques for the attachment of priorities and/or reaction time limits to various entities of the system such as, for example, events, event types, queries, etc. The system's processing may be tailored behavior to match these boundary conditions while at the same time increasing (and sometimes even maximizing) the rate of events processed. Advantageously, the system may be made to adapt its behavior to the current situation, which is changeable and may even be changing quite frequently, e.g., as in connection with a potentially rapidly changing stream.

BACKGROUND AND SUMMARY OF EXAMPLE EMBODIMENTS OF THE INVENTION

Stream processing typically follows the pattern of continuous queries. Continuous queries are queries that execute for an indefinite amount of time on data that can change very rapidly. Such rapidly changing data are called streams, and streams oftentimes comprise events. Streams exist in many real-world scenarios, e.g. temperature readings from sensors placed in warehouses or on trucks, weather data, entrance control systems (where, for example, events are generated whenever a person enters or leaves), etc. The meanings of these and/or other terms herein may be clarified by referring to the "Event Processing Glossary," published by the "Event-Processing Technical Society" (EP-TS), the entire contents of which is hereby incorporated herein by reference.

One typical scenario where continuous queries sometimes are implemented involves the monitoring or surveillance of systems that sometimes are quite complex in nature. A multitude of streams may exist in such an example scenario. However, it will be appreciated that not all events are of equal importance in all such scenarios. For example, in a power plant, the temperature data of the cooling liquid tends to be less important than a security breach. Certain conditions may, however, shift these priorities. For example, very high temperature data, temperature data in the context of low amounts of cooling fluid, etc., may shift priorities.

In many systems, there is a risk that important data may be processed too late to guarantee a timely reaction. Such problems may be caused, for example, by the sheer amount of data arriving in the streams, a lack of resources for handling such data, etc. Although sometimes the delay will not be too problematic, it will be appreciated that there are many scenarios where the failure to timely process large amounts of data based on shifting priorities might become quite serious. For instance, a business enterprise may not be able to timely deliver needed goods and/or services. Of course, the failure to adjust to shifting priorities in the power plant scenario, for example, may be catastrophic.

There are several currently available systems for continuous query processing. TIBCO®, for example, describes what may be termed a "query system." Other query systems are described, for example, in U.S. Publication Nos. 2009/0292877 and 2009/0292759, the entire contents of which are hereby incorporated by reference in their entireties. TIBCO®, for example, describes one example query system indicating that:

"At runtime each declaration matches against every instance (and the rule is therefore effectively compared to every combination of instances—or RuleVariable tuples). Example: a declaration of CustomerCallEvent and ActiveCustomer for 2 CustomerCallEvents and 50 Customers will create 100 possible combinations or tuples to be considered. Adding a declaration of CustomerOrder with 100 instances increases this to 10,000 combinations or tuples.

This illustrates both the flexibility and potential cost of production rules—although of course the Rete algorithm can scale to very large tuple numbers."

The TIBCO® example continues by stating that:

"In addition, rules may have names, priority numbers and other metadata. Rule priorities are to aid in 'conflict resolution', a fancy term for what happens when 2 or more rules are valid to fire: which do we want to fire first?"

In the TIBCO® example system, events are fully processed in any case, and there are no apparent means to process important events in a prioritized fashion. Thus, the above-described and other conventional query systems unfortunately do not provide flexible mechanisms that help ensure increased (and sometimes even maximum) data processing while also caring for timely processing of events at the same time.

Thus, it will be appreciated that there is a need in the art for techniques that overcome these and/or other disadvantages. For example, it will be appreciated that there is a need in the art for techniques that provide flexible mechanisms that help ensure increased (and sometimes even maximum) data processing while also caring for timely processing of events at the same time.

One aspect of certain example embodiments relates to the attachment of priorities and/or reaction time limits to various entities of the system such as, for example, events, event types, queries, etc.

Another aspect of certain example embodiments relates to using priorities attached to system entities to tailor the system's processing behavior to match these boundary conditions while at the same time increasing (and sometimes even maximizing) the rate of events processed.

Advantageously, the system may be made to adapt its behavior to the current situation, which is changeable and may even be changing quite frequently, e.g., as in connection with a potentially rapidly changing stream. Users may in certain example embodiments specify policies to control this adaptation in certain example embodiments and, thus, in certain example instances, events (including events of special interest) may be handled appropriately, even in response to changing conditions.

It will be appreciated that in some cases, the appropriate handling of events may involve the at least temporary suspension of some routine activities while events of interest (e.g., "business critical" or "mission critical" events) are processed according to their priorities.

In certain example embodiments, a method for handling a stream of events is provided. The stream of events is received, with at least some of said events having boundary conditions attached thereto, and with the boundary conditions being maximum reaction times and/or priorities. Predefined queries are executed, via at least one processor of a computer system, on the events. For each said event having a maximum reaction time and/or priority attached thereto: whether the event can be processed within the attached boundary condition is estimated, the predefined queries are processed according to a first mode when the event can be processed within the attached boundary condition, and the predefined queries are processed according to a second mode when the event cannot be processed within the attached boundary condition. The second mode is practiced by at least temporarily suspending queries that do no consume events with attached boundary condition instead processing other queries. The second mode is ended and processing proceeds according to the first mode when it is estimated that unconsumed events having attached boundary conditions can be processed within their attached boundary conditions.

In certain example embodiments, a method for configuring a system to handle a stream of events is provided. A plurality of event types is defined. Said event types are stored in an event type registry. The system is able to execute in first and second modes. The stream of events is received, with at least some of said events having boundary conditions attached thereto, and with the boundary conditions being maximum reaction times and/or priorities. Queries are executed, via at least one processor of the system, on the events. For each said event having a maximum reaction time and/or priority attached thereto: whether the event can be processed within the attached boundary condition is estimated, the queries are processed according to the first mode when the event can be processed within the attached boundary condition, and the queries are processed according to the second mode when the event cannot be processed within the attached boundary condition. The second mode is practiced by at least temporarily suspending queries that do no consume events with attached boundary condition instead processing other queries. The second mode is ended and processing is returned to the first mode when it is estimated that unconsumed events having attached boundary conditions can be processed within their attached boundary conditions.

In certain example embodiments, corresponding systems for providing, configuring, and/or executing the above may be provided in addition or in the alternative.

In certain example embodiments, corresponding computer readable storage media tangibly storing instructions for executing such methods also may be provided.

These aspects and example embodiments may be used separately and/or applied in various combinations to achieve yet further embodiments of this technology.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Systems for processing of continuous queries on streams of events are often inherently sized for a certain maximum load. In cases where the load suddenly increases beyond expectations, for example, these systems may be overloaded, potentially resulting at least in increased response and reaction times. When these systems have a business-critical function, e.g., controlling a power plant status or financial trade control, there are certain situations where it is not acceptable if certain predefined reaction times are exceeded for certain severe events. Unfortunately, the same system may nonetheless perform certain routine activities where increased reaction time or even partial or complete suppression of such computations may not matter from micro- and/or macro-perspectives. As alluded to above, however, existing systems for continuous query processing on streams of events do not provide mechanisms that allow users to define "handling policies" for both events of interest routine events. Rather, it is believed that in conventional systems, users only define a sequence for the rules to be applied, and all rules nevertheless are applied for all incoming events.

Certain example embodiments address these and/or issues, e.g., by attaching priorities and/or reaction time limits to various entities of the system such as, for example, events, event types, queries, and/or the like. The systems of certain example embodiments may tailor their processing behaviors to match these boundary conditions while at the same time increasing (and sometimes even maximizing) the rate of events processed. Thus, the systems of certain example embodiments may adapt their behaviors to the current set of situations. The user may also specify policies to control this adaptation in certain example instances.

Figure 1:
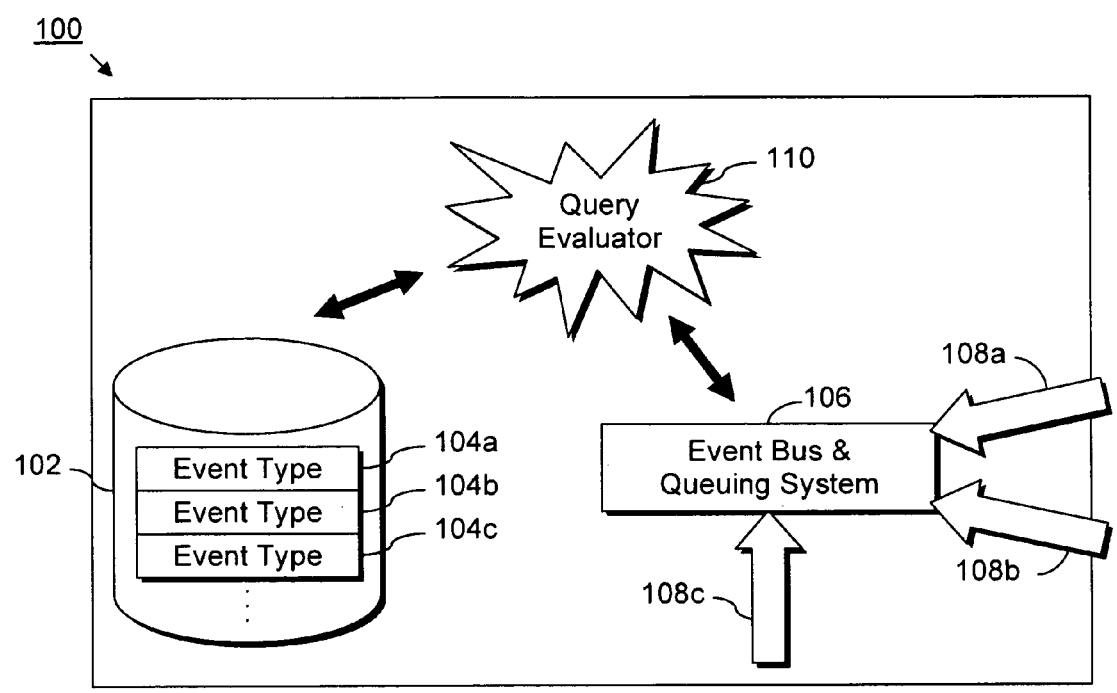
FIG. 1 is a simplified block diagram showing components of an example improved query system in accordance with an example embodiment.

Referring now more particularly to the drawings in which like components have like reference numerals throughout the several views, FIG. 1 is a simplified block diagram showing components of an example improved query system 100 in accordance with an example embodiment. The example query system 100 in FIG. 1 includes an event type registry 102. The event type registry 102 may be any suitable data storage location and may include definitions for various event types 104a, 104b, 104c, etc. Events occurring in the example query system 100 may have exactly one associated event type 104. Event types 104 define the information contained in an event (including, for example, the event attributes) and include metadata, comprising a default priority that will be assigned to any event of the associated type. The default priority may, however, be overwritten by further mechanisms described below, for example. In addition to priorities that are simple numbers (e.g., where lower numbers indicate more importance or higher priority), reaction time limits also may be attached to event types 104. As with priorities, reaction time limits also may be overwritten on an event-by-event basis if desired in certain example implementations. Although certain example embodiments involve one-to-one event-to-event type mappings, this need not be the case in all example embodiments. In addition, event types may inherent attributes and/or other metadata from parent event types in certain example embodiments.

Figure 2:
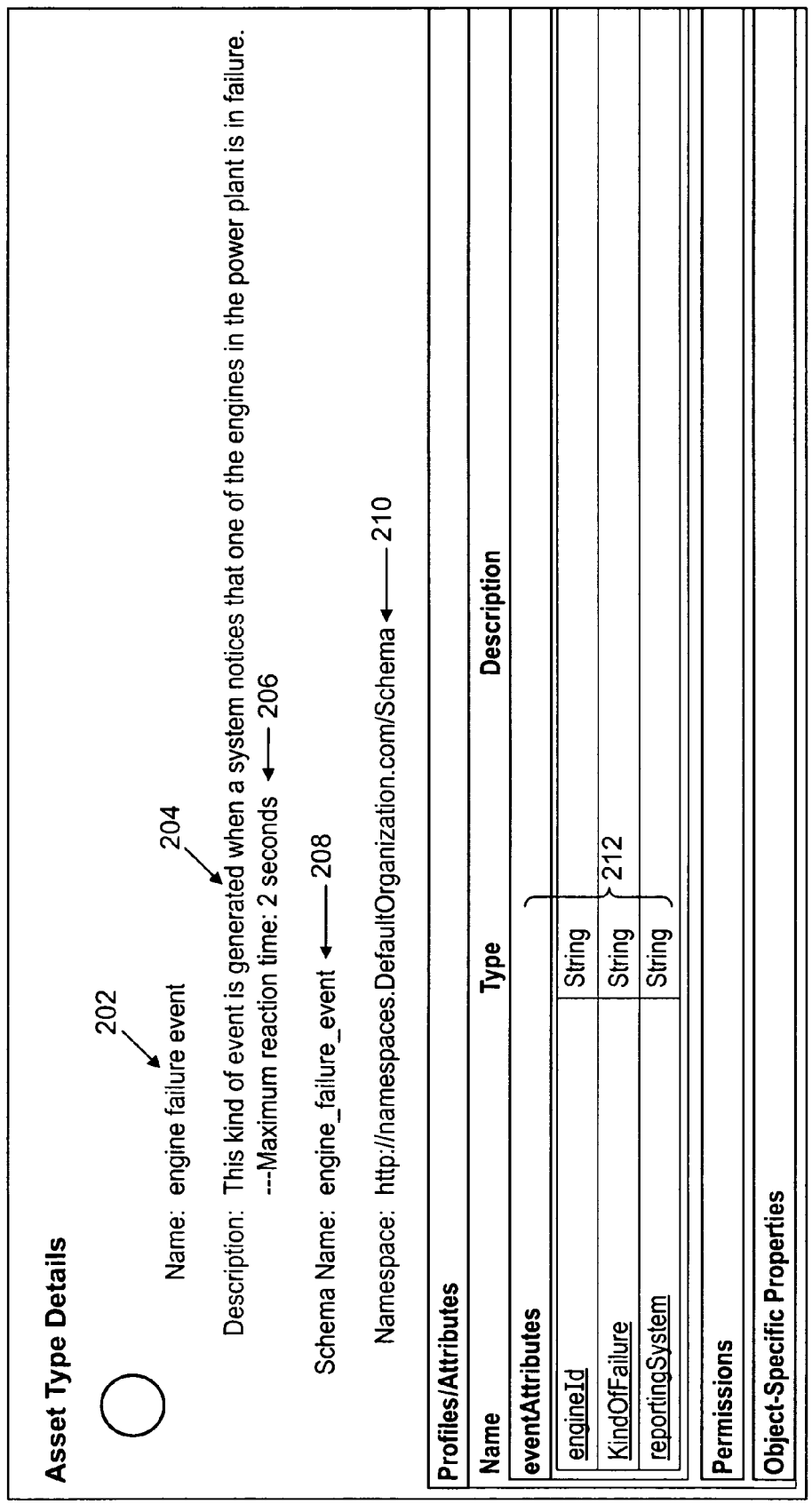
FIG. 2 is an example event type definition in accordance with an example embodiment.

FIG. 2 is an example event type definition 104 in accordance with an example embodiment. As indicated above, the example event type definition 104 may be stored in the event type registry 102 from FIG. 1 in certain example embodiments. The FIG. 2 example event type definition 104 has a name 202, a description of the event 204, a maximum reaction time 206, and an associated metadata schema 208 stored at an identified namespace 210. More particularly, in the FIG. 2 example, the event type is for an "engine failure event," which in this example is generated when the system notices that one of the engines in a power plant is in a failure state. The maximum reaction time for events falling into this event type is 2 seconds (although other reaction times could be applied to this and/or other event types, and the reaction time could be overwritten for a specific event). The metadata is stored according to a schema (e.g., "engine_failure_event" in the FIG. 2 example) at a predefined or specified namespace (e.g., http://namespaces.DefaultOperation.com/ Schema in the FIG. 2 example).

Event attributes 212 common to the FIG. 2 example event type also may be defined. In the FIG. 2 example, for instance, event attributes include the associated engine (engineId), the particular kind of failure, and the responsible reporting system. Other attributes may be provided for this and/or other event types. Permissions also may be set. Although not expressly shown in the FIG. 2 example event type, as indicated above, in addition to or in place of setting a maximum reaction time, associated priorities may be set. And, as above, these associated priorities may be overwritten for one or more specifically identified events.

Referring again to FIG. 1, the system 100 also may include an event bus and queuing system 106. The event bus and queuing system 106 of certain example embodiments is the infrastructure where all events enter the system 100, whether they are external events or internally generated. As can be seen in the FIG. 1 example, at least some events may be generated externally (events 108a and 108b) and at least some events may be generated internally (event 108c). In certain example embodiments, a single event bus and queuing system 106 may be partitioned to receive external events separately from internally generated evens. The event bus and queuing system 106 nonetheless may in certain example instances treat such events the same or at least in a similar fashion (e.g., according to their associated event types), regardless of whether their origin is from within or from outside of the system 100.

Figure 3:
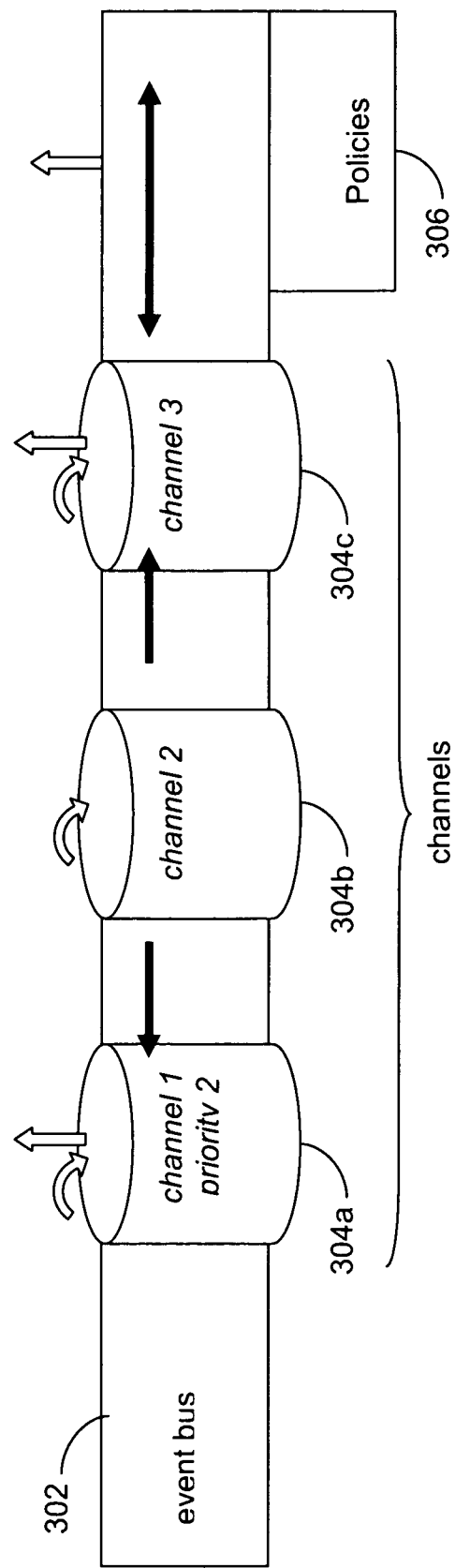
FIG. 3 is a simplified block diagram showing components of an example event bus and queuing system in accordance with an example embodiment.

FIG. 3 is a simplified block diagram showing components of an example event bus and queuing system 106 in accordance with an example embodiment. The example event bus and queuing system 106 shown in FIG. 3 includes an event bus 302. A plurality of channels 304a, 304b, 304c, etc., may "sit" on the event bus. Events can be assigned to such channels 304 sitting on the event bus 302. The channels 304 themselves may be logical partitions of the set of all events. Event sources (108a, 108b, 108c, etc., in FIG. 1) may post events explicitly to certain channels 304. Channels 304 also may have priorities or reaction times assigned thereto. For instance, in the FIG. 3 example, channel 1 has an assigned priority of 2. As can be seen in the FIG. 3 example, all three channels 304a, 304b. and 304c receive external inputs. However, first and third channels 304a and 304c receive inputs that are generated as output from the second channel 304b. Of course, it will be appreciated that more or fewer channels may be provided on the event bus 302 in certain example embodiments, and that the same or different priorities may be assigned to these and/or other channels.

The example event bus and queuing system 106 shown in FIG. 3 may also help evaluate policies 306 (described in greater detail below) and may help handle priorities (also described in greater detail below). The ability to select events based on priorities or properties implies a richer interface than a conventional publish/subscribe system (e.g., because it may be configured to filter based on attributes such as priorities, etc.). However, certain example embodiments may be built from suitably modified publish/subscribe systems. See, for example, 2009/0064182 and 2010/ 0251262, the entire contents of which are hereby incorporated herein by reference.

Referring once again to FIG. 1, query evaluating program logic 110 may be provided for evaluating the continuous queries. As the name suggests, queries may execute indefinitely once they are started. The input data for these queries include events of certain types specified by the query. The events are passed to the query whenever they are generated. Thus, in certain example instances, the input data for the queries may be constantly changing and potentially difficult to define over the indefinite time period. This situation is contrastable with database queries, for which the input data set typically is predetermined and quite static once the query execution has been started. In any event, events passed to a certain continuous query may form an event stream. The results of these queries are also events that are produced one-by-one such that the query result is also an indefinite stream of events. Queries may or may not restrict their inputs to certain event types. Furthermore, queries typically specify certain conditions on the attributes of events that have to be matched before the event is processed by the query.

Continuous queries may be specified in various languages. Example languages include, for example, SQL dialects, XQuery extensions, proprietary languages, etc. A query may include some or all of the following and/or other parts:

A specification of the event types on which it works (the event types it consumes), Optional conditions (or constraints) on the events on which it works, Transformation specifications that specify how to compute the query output from the query input, and/or A definition of output events with an explicit or implicit event type.

The query evaluating program logic 110 may also monitor the reaction times. Reaction time is defined as the time between the arrival of an event at the event bus and queuing system 106 and its consumption by all queries that will eventually consume the event. This implies that an event may be consumed by multiple queries. In some normal operation modes (modes that are not interrupted because of concerns about the potential timeliness of processing), events are consumed in the sequence of their arrival. This may in certain example embodiments involve serial processing that may result in first-in-first-out (FIFO) type processing, and/or or parallel processing where FIFO type processing is not always guaranteed.

Example Techniques for Handling Reaction Times

Figure 4:
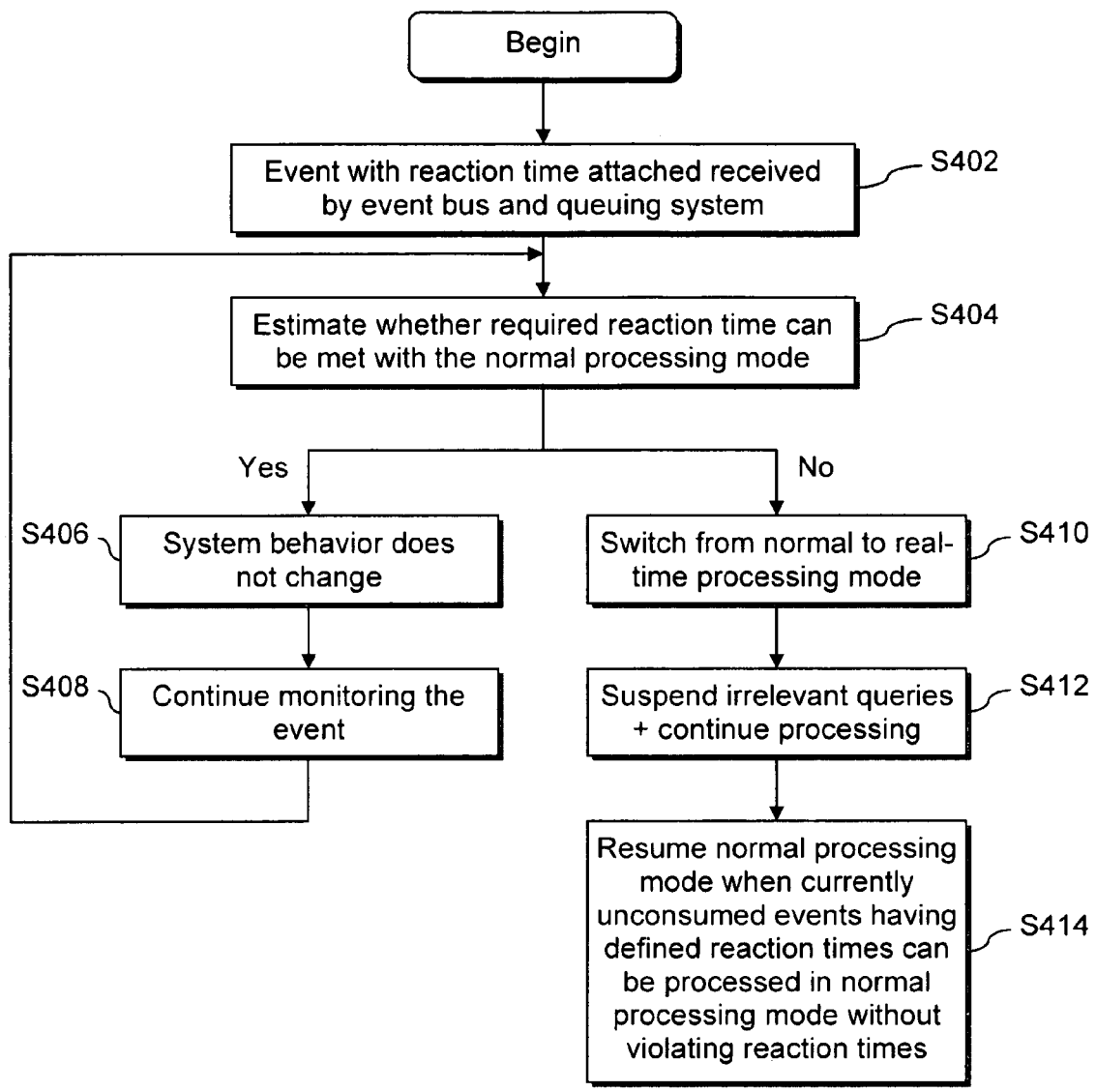
FIG. 4 is a flowchart illustrating example techniques for handling reaction times in accordance with an example embodiment.

FIG. 4 is a flowchart illustrating example techniques for handling reaction times in accordance with an example embodiment. When an event that has a reaction time attached (either directly, via the channel at which it is received, via the event type definition, or in some other way) is received by the event bus and queuing system 106 (step S402), the event bus and queuing system 106 uses the query evaluating program logic 110 to generate statistics on reaction times. These statistics may, in turn, be used to estimate whether the required reaction time can be met with the normal processing mode (step S404). Such estimations may be based, for example, on the techniques described in U.S. Publication No. 2010/0030896, the entire contents of which are hereby incorporated herein by reference. Of course, these and/or other statistical or non-statistical techniques may be used for such estimations, judgments, or determinations.

If the required reaction time can be met with the normal processing mode, the system behavior does not change (step S406). However, the event bus and queuing system 106 keeps monitoring the event (step S408). In the event that the evaluating program logic 110 estimates that reaction time requirements cannot be fulfilled (either by its initial estimation from step S404 or during later monitoring from step S410), the event bus and queuing system 106 may be made to switch from normal processing mode to real-time processing mode (step S410). In the real-time processing mode, queries that do not consume events with defined reaction times (labeled herein as irrelevant queries and discussed in greater detail below) are at least temporarily suspended (step S412), and processing continues in this real-time processing mode.

It will be appreciated that in the real-time processing mode, other events with defined reaction times may be received that would be consumed by the suspended queries. In this case, these queries may be resumed. Thus, for each new event with defined reaction times, the set of relevant queries may be determined. Furthermore, events that are not consumed by the remaining relevant queries (events not in set N as discussed in greater detail below) are held back in the event bus and queuing system 106. For the remaining queries and events, real-time scheduling techniques may be applied to help ensure that reaction times are met. It will be appreciated that approaches to finding an optimal or at least improved plan for the processing of continuous queries may be treated similarly to traditional database system query optimization and thus handled in accordance with the techniques described in U.S. Publication No. 2010/0030896, for example.

A rule may be specified to resolve conflicts in the event that event types and channels both define reaction times. For instance, a suitable rule might be that if event types and channels define both reaction times, the shorter time is to be used. An explicit reaction time setting for a single event may overwrite the channel or type specific reaction times, thereby also providing the capability to make an event "less urgent."

Once the system estimates that the currently unconsumed events that have defined reaction times could be processed in normal processing mode without violating the reaction times, the system 100 may switch back to normal processing mode (step S414), resuming all queries and delivering all events. It will be appreciated that the suspended queries might consume events that have no defined reaction times but that were already processed by the non-suspended queries. In such a case, the event bus and queuing system 106 may maintain such events (e.g., in a suitable data store) until they are consumed by all queries.

Example Techniques for Handling Priorities

Figure 5:
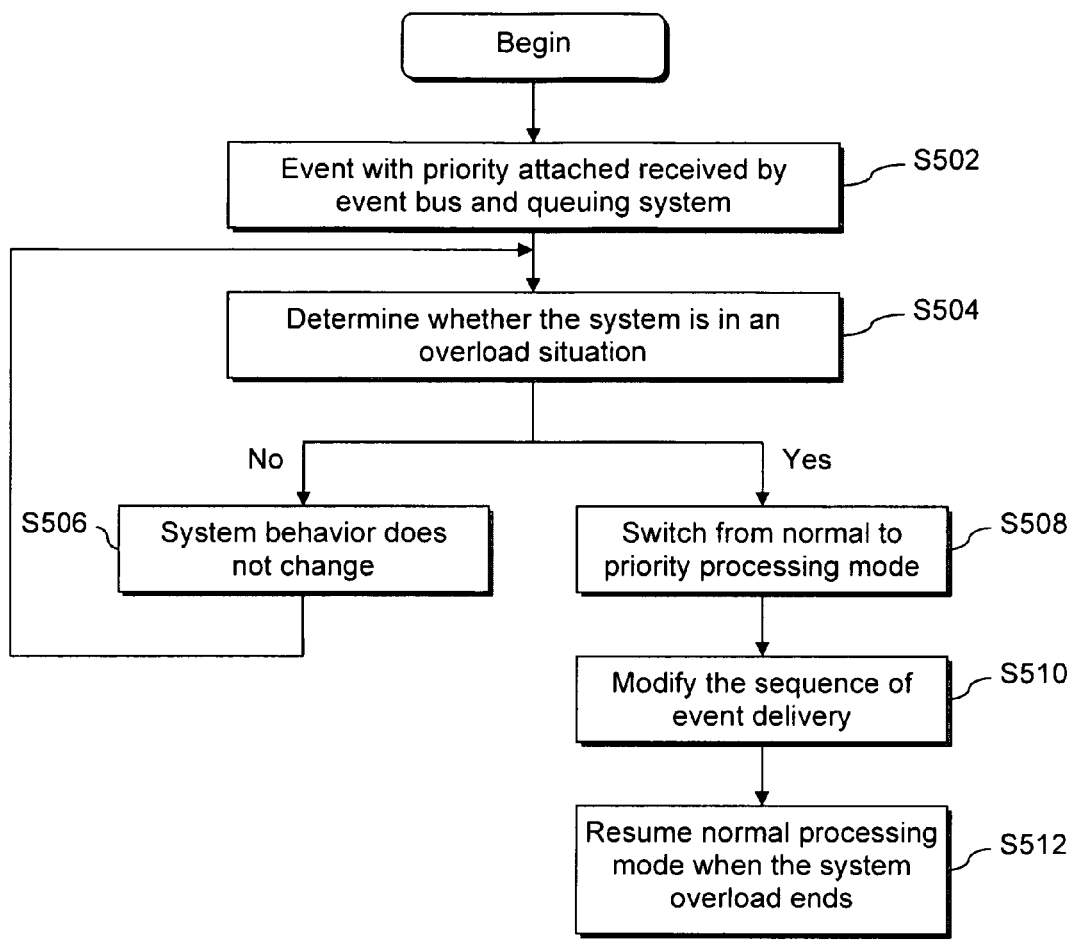
FIG. 5 is a flowchart illustrating example techniques for handling priorities in accordance with an example embodiment.

FIG. 5 is a flowchart illustrating example techniques for handling priorities in accordance with an example embodiment. As will be appreciated from the discussion that follows, the FIG. 5 example flowchart is in many ways similar to the FIG. 4 example flowchart. In any event, referring now to FIG. 5, when an event that has a priority attached (either directly, via the channel at which it is received, via the event type definition, or in some other way) is received by the event bus and queuing system 106 and the system is in normal processing mode (step S502), the event bus and queuing system checks whether the system is in an overload situation (step S504). This may be the case if, for example, the arrival rate of events is higher than the consumption rate. If this is not the case, the system behavior does not change (step S506). If this is the case, however, the system switches form normal processing mode to priority processing mode (step S508). In this priority processing mode, the sequence of event delivery is modified (step S510). Events with the highest priority are delivered first, together with all events that are needed by the queries that consume these high-priority events (set N, described in greater detail below). Events with the next highest priority may be delivered next, and so on.

Similar to the above, if event types and channels both define priorities, a rule may be defined to resolve any conflicts that might arise. For instance, the rule may specify that the higher priority is to be used. An explicit priority setting for a single event therefore may always overwrite channel or type specific priorities, effectively enabling the system to demote an event or make that event "less important."

Once the system overload is resolved, the system switches back to normal processing mode (step S512), e.g., delivering all events in the sequence of their arrival. It is possible that in this processing mode, events are discarded and never delivered (e.g., when certain system resource limits are reached).

It will be appreciated that the same event may have priority and reaction times assigned in certain example instances. In such cases, both may be handled independently, e.g., in connection with the techniques described above.

Example Techniques for Query Partitioning

The processing model as described above implies that it is possible to identify queries that consume certain events, e.g., events from the event set E that is defined by all events that have a reaction time defined or by the events with the highest priority, as described above. Furthermore, the set of all events consumed by such queries may be determined. The separation of all queries in the system into those that will consume a certain set of events (relevant queries) and those that do not (irrelevant queries), is referred to herein as query partitioning.

The set S of events implies a set T of event types: $T_S = \{t | e \in S$ and $t$ is type of $e\}$.

A query Q specifies the event type(s) $T_Q$ it consumes. Thus, all queries Q for which $T_S \cap T_Q = \emptyset$ are irrelevant queries.

A query may also specify constraints C on the events of types in $T_Q$. These can also be used to add queries to the set of irrelevant queries. For example, whenever there is no event in E that satisfies C, the query can be added to the irrelevant queries. Each query that is not a member of the set of irrelevant queries is a relevant query.

A relevant query might need more events as input than are in set E to ensure that the query semantics remains unchanged in certain example instances. The types of these events may be defined by $T_Q$. All events of these types form the set of possibly needed events N. The query constraints may be used to reduce the set of possibly needed events in certain example instances.

It will be appreciated that the example query partitioning techniques described herein may be performed by any suitably configured arrangement of program logic. Such program logic may, for example, also be the query evaluating program logic, a component thereof, or different therefrom. Furthermore, the program logic configured to perform the example query partitioning techniques described herein may be operably connected to the event bus and queuing system 106 and the event type registry 102, e.g., to analyze incoming events and to assess dependencies, for example, in the manners described above.

Priorities and/or reaction times need not always be assigned as attributes to all possible events. The query language nevertheless may grant access to the priority and the defined reaction time for an event, and also may allow for setting priorities and defining reaction times for the events constituting the output result. For example, when a generated event is based on high-priority events, it may be desirable to assign a high priority to this generated event. Such assignments may be user-driven, automatic, or some combination thereof.

Channels and event types may be assigned a priority or reaction time (e.g., by the user of the system). However, a different technique may be employed for single events. As fast event processing may be assumed, user-specified priority or reaction time adjustment may not always be effective and/or accurate. The source of the events that sends them to the event bus and queuing system 106 may assign priority or reaction time in certain example embodiments. In certain example embodiments, in addition, or as an alternative, to user-specified and/or source specification, policies may be used as a powerful and adaptive mechanism in the event bus and queuing system 106. Policies may react on system states, on event attribute values, on existing priorities and reaction times, etc. A policy may comprise a condition and an action. A policy may apply to a single event or to a set of events, e.g., by setting and/or modifying their priority or reaction time, switching the processing mode, etc. Example policies may include, for example:

If there is an event of type "security alert", then assign highest priority to this event and switch processing mode to "priority processing";

If an event occurs whose reaction time is less than a second, then switch to real-time processing;

If an event of type "temperature" shows a value above 100 degrees, then set its priority to, "1";

If there is an event indicating low cooling fluid, then set priority of all temperature events up by 4;

If an event has priority 1, then set its reaction time to 1 second; and

If an engine failure is reported, then assign event to channel "system state".

The system 100 may in certain example embodiments provide logging facilities to make policy-driven changes auditable. Such logging facilities (not shown in FIG. 1) may include logging program logic, a data store for storing logged objects, etc. Logs may include, for example, the type of processing and/or policies being implemented before the change, the conditions that necessitated the change, the duration of the change, the type of processing and/or policies being implemented during the change, the queries affected by the change (including, for instance, an identification of the accelerated and/or demoted queries together with or apart from any dependent queries, etc.), and/or like information.

In certain example embodiments, priorities may be assigned to queries. The system 100 may compute corresponding priorities for the events consumed by the queries. Prioritization also may use the knowledge from previous computations to improve and sometimes even optimize its behavior. For instance, a data store may be maintained and used to store information about previous computations that may be fed into the query evaluating program logic 110 for optimization calculations.

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having a processor execute instructions that may be tangibly stored on a computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for handling a stream of events, the method comprising:
receiving the stream of events, at least one of said events having boundary conditions attached thereto, the boundary conditions being maximum reaction times and/or priorities;
executing, via at least one processor of a computer system, predefined queries on the events;
for each said event having a maximum reaction time and/or a priority attached thereto:
estimating whether the event can be processed within the attached boundary condition,
processing the predefined queries according to a first mode when the event can be processed within the attached boundary condition, and
processing the predefined queries according to a second mode when the event cannot be processed within the attached boundary condition, wherein the second mode is practiced by at least temporarily suspending queries that do not consume events with attached boundary condition instead processing other queries; and
ending the second mode returning to processing according to the first mode when it is estimated that unconsumed events having attached boundary conditions can be processed within their attached boundary conditions.

2. The method of claim 1, further comprising resuming, at least temporarily suspended queries, and delivering all events when the second mode is ended.

3. The method of claim 1, further comprising temporarily storing, in a data store, any at least temporarily suspended queries.

4. The method of claim 1, further comprising, in the second mode, resuming any at least temporarily suspended queries associated with further received events that have attached boundary conditions.

5. The method of claim 4, further comprising applying real-time scheduling techniques to develop an improved processing plan during the second mode.

6. The method of claim 1, wherein the events are received via predefined channels on an event bus.

7. The method of claim 6, wherein at least one of said channels has a boundary condition associated therewith.

8. The method of claim 7, further comprising when an event has an attached boundary condition and a channel receiving the event also has an associated boundary condition, performing said estimating using a shorter reaction time and/or a higher priority.

9. The method of claim 1, wherein each said event has an associated predefined event type.

10. The method of claim 9, wherein boundary conditions for events are at initially set by virtue of the event type.

11. The method of claim 10, wherein each said query includes a specification of any event types consumed, transformation specifications specifying how to compute any query outputs from any query inputs, and a definition of any output events with an explicit or implicit event type.

12. The method of claim 11, wherein the query further includes conditions or constraints for any events it consumes.

13. The method of claim 1, wherein at least one of said events have a maximum reaction time and/or a priority attached thereto indirectly by virtue of an assignment of the maximum reaction time and/or the priority to one or more associated event types on which the events are based.

14. A method for configuring a system to handle a stream of events, the method comprising:
defining a plurality of event types;
storing said event types in an event type registry; and
enabling the system to execute in first and second modes, wherein:
the stream of events is received, at least one of said events having boundary conditions attached thereto, the boundary conditions being maximum reaction times and/or priorities;
queries are executed, via at least one processor of the system, on the events;
for each said event having a maximum reaction time and/or a priority attached thereto:
whether the event can be processed within the attached boundary condition is estimated,
the queries are processed according to the first mode when the event can be processed within the attached boundary condition, and
the queries are processed according to the second mode when the event cannot be processed within the attached boundary condition, wherein the second mode is practiced by at least temporarily suspending queries that do not consume events with attached boundary condition instead processing other queries; and
the second mode is ended and processing is returned to the first mode when it is estimated that unconsumed events having attached boundary conditions can be processed within their attached boundary conditions.

15. The method of claim 14, wherein at least temporarily suspended queries are resumed and all events are delivered when the second mode is ended.

16. The method of claim 14, wherein any of the at least temporarily suspended queries associated with further received events that have attached boundary conditions are resumed in the second mode.

17. The method of claim 14, further comprising configuring channels on an event bus of the system, the events being receivable by the channels.

18. The method of claim 17, wherein at least one of said channels has a boundary condition associated therewith.

19. The method of claim 18, wherein when an event has an attached boundary condition and a channel receiving the event also has an associated boundary condition, said estimating is performed using a shorter reaction time and/or a higher priority.

20. The method of claim 14, wherein each event is associated with exactly one event type.

21. The method of claim 14, further comprising defining said queries to include a specification of any event types consumed, transformation specifications specifying how to compute any query outputs from any query inputs, and a definition of any output events with an explicit or implicit event type.

22. The method of claim 21, wherein said queries further include conditions or constraints for any events they consume.

23. A system configured to generate and process a stream of events, comprising:
an event bus configured to receive the stream of events, at least one of said events having boundary conditions attached thereto, the boundary conditions being maximum reaction times and/or priorities;
at least one processor configured to execute predefined queries on the events, the at least one processor being further configured to:
for each said event having a maximum reaction time and/or a priority attached thereto:
estimate whether the event can be processed within the attached boundary condition,
process the predefined queries according to a first mode when the event can be processed within the attached boundary condition, and
process the predefined queries according to a second mode when the event cannot be processed within the attached boundary condition, wherein the second mode is practiced by at least temporarily suspending queries that do not consume events with attached boundary condition instead processing other queries; and
end the second mode return to processing according to the first mode when it is estimated that unconsumed events having attached boundary conditions can be processed within their attached boundary conditions.

24. A non-transitory computer readable storage medium tangibly storing instructions that, when executed by a processor of a system, performs functionality comprising:
receiving the stream of events, at least one of said events having boundary conditions attached thereto, the boundary conditions being maximum reaction times and/or priorities;
executing, via at least one processor of a computer system, predefined queries on the events;
for each said event having a maximum reaction time and/or a priority attached thereto:
estimating whether the event can be processed within the attached boundary condition,
processing the predefined queries according to a first mode when the event can be processed within the attached boundary condition, and
processing the predefined queries according to a second mode when the event cannot be processed within the attached boundary condition, wherein the second mode is practiced by at least temporarily suspending queries that do not consume events with attached boundary condition instead processing other queries; and
ending the second mode returning to processing according to the first mode when it is estimated that unconsumed events having attached boundary conditions can be processed within their attached boundary conditions.

25. A system configured to generate and process a stream of events, comprising:
    a memory configured to store one or more instructions for generating and processing the stream of events; and
    at least one processor, operatively associated with the memory, and configured to at least:
        define a plurality of event types;
        store said event types in an event type registry; and
        enable the system to execute in first and second modes, wherein:
            the stream of events is received, at least one of said events having boundary conditions attached thereto, the boundary conditions being maximum reaction times and/or priorities;
            queries are executed, via at least one processor of the system, on the events;
            for each said event having a maximum reaction time and/or a priority attached thereto:
                whether the event can be processed within the attached boundary condition is estimated,
                the queries are processed according to the first mode when the event can be processed within the attached boundary condition, and
                the queries are processed according to the second mode when the event cannot be processed within the attached boundary condition, wherein the second mode is practiced by at least temporarily suspending queries that do not consume events with attached boundary condition instead processing other queries; and
            the second mode is ended and processing is returned to the first mode when it is estimated that unconsumed events having attached boundary conditions can be processed within their attached boundary conditions.

26. A non-transitory computer readable storage medium tangibly storing instructions that, when executed by a processor of a system, performs functionality comprising:
    defining a plurality of event types;
    storing said event types in an event type registry; and
    enabling the system to execute in first and second modes, wherein:
        the stream of events is received, at least one of said events having boundary conditions attached thereto, the boundary conditions being maximum reaction times and/or priorities;
        queries are executed, via at least one processor of the system, on the events;
        for each said event having a maximum reaction time and/or a priority attached thereto:
            whether the event can be processed within the attached boundary condition is estimated,
            the queries are processed according to the first mode when the event can be processed within the attached boundary condition, and
            the queries are processed according to the second mode when the event cannot be processed within the attached boundary condition, wherein the second mode is practiced by at least temporarily suspending queries that do not consume events with attached boundary condition instead processing other queries; and
        the second mode is ended and processing is returned to the first mode when it is estimated that unconsumed events having attached boundary conditions can be processed within their attached boundary conditions.

* * * * *